United States Patent Office 2,986,833
Patented June 6, 1961

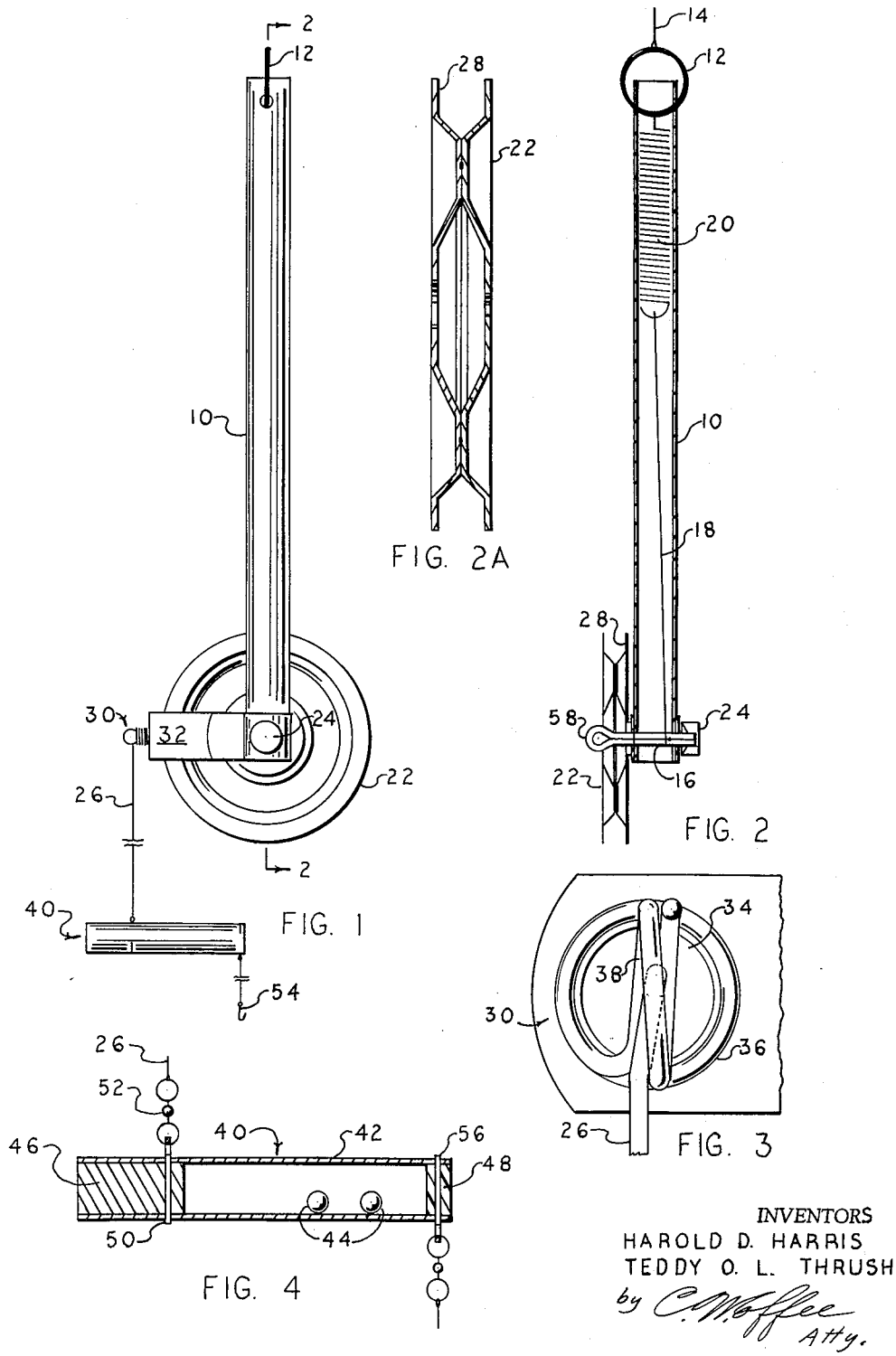

2,986,833
AUTOMATIC FISHING DEVICE
Harold D. Harris, 2623 28th St., Lubbock, Tex., and Teddy O. L. Thrush, P.O. Box 345, Lubbock, Tex.
Filed Dec. 17, 1958, Ser. No. 781,006
3 Claims. (Cl. 43—15)

This invention relates to the art of catching fish and more particularly to a reel device for automatically setting the hook into the fish's mouth and playing the fish in.

There are basically two problems in fishing: first, getting the fish to take a baited hook; and second, bringing the fish to captivity with the hook. We have solved the first of these problems by providing a fish caller to attract the fish to the bait. We have solved the second of these problems by providing an automatic device which closely simulates the hand of an experienced fisherman in setting the hook into the fish's mouth and then in reeling the fish to the surface, providing a certain amount of play so that the fish cannot jerk the line loose.

An object of this invention is to provide a device which will automatically set a hook in a fish's mouth.

Another object is to provide a device which will automatically play a fish by always providing a certain tension bringing the fish toward the device; however, not providing an excess of tension that might otherwise permit the fish to throw the hook out of its mouth.

A further object of this invention is to provide such a device with a handle to hold the device by hand as a modified usage.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, in which:

FIG. 1 is an elevational view of a device built according to this invention.

FIG. 2 is a schematic sectional view of the device taken on line 2—2 of FIG. 1.

FIG. 2a is an enlarged sectional view of the reel shown in FIGS. 1 and 2.

FIG. 3 is a detail of the clip whereby the line is held in the set position.

FIG. 4 is an axial section of the fish caller.

As may be seen in the accompanying drawings, one embodiment in accordance with this invention has an elongated tube 10 as its principal member. Ring 12 passes through diametrical holes in the upper end of the tube. Twine 14 is attached to the ring and provides means by which the device is hung from a tree limb, boat, or similar object in use. Alternately, the angler may grasp the tube in his hand as a handle when using the device.

Shaft 16 is mounted for rotation about its axis at the lower end of tube 10. The shaft extends diametrically across the tube. Cord 18 is wound around the shaft so that the shaft acts as a windlass drum. Helical tension spring 20 is attached at its lower end to the cord and its upper end to the ring. The spring is within the tube and in its stretched position will extend substantially the full length of the tube.

Reel 22 is attached to one ned of the shaft. The attachment is such that the reel does not rotate relative to the shaft. Stop or cap 24 on the other end of the shaft prevents axial movement of the shaft. Fishing line 26 is wound around the reel along the periphery thereof in V-shaped groove 28. As may be seen, the spring 20 acting through the cord will tend to rotate the shaft. The torque exerted upon the shaft will be proportional to the product of the radius of the shaft and the force of the spring. This torque will tend to wind the line 26 around the reel as the cord unwinds. The force on the line will be related to the force exerted by the spring by a factor based on the ratio of the diameter of the shaft to the diameter of the reel.

In the normal position the line is prevented from being drawn onto the reel by being attached in clip 30. Arm 32 is securely attached to the tube around one of the holes through which shaft 16 passes. The arm extends radially of the reel and at right angles to the tube although the later relationship is not critical. The terminal portion of the arm is bent and has hole 34 therethrough. The hole passes through a portion of the arm which is parallel to the axis of the shaft. A small helical spring 36 is used to construct the clip. The arm is a flat strap constructed of sheet material. The spring 36 is threaded into the hole 34 and securely attached by having the flat strap caught between the two revolutions of the spring. The line 26 is threaded through the hole 34 as well as the spring 36. The hole 34 is smaller in diameter than the inside diameter of the helical spring 36. The last two or three revolutions 38 of the spring are distorted so that the axis of these revolutions is at right angles and intersects the axis of the remainder of the helix. The axis of the remainder of the helix will also intercept these last two revolutions. Line 26 is threaded through the spring 36 and pulled out to the extent desired. Then a portion of the line is slipped between the last two revolutions 38 so that it is held by spring pressure. Thus the device is set.

Fish caller 40 has as its main element a small tube 42 plugged at both ends with discs or plugs 46 and 48 so that a water-tight air space is formed between the discs. Shot or pellets 44 are in the air space. The caller is attached to the line 26 by a diametrical cotter key 50, which passes through plug 46. Swivel 52 is attached to the eye of the key as is customary in the fishing art. Fish hook 54 is attached to the other end of the tube by cotter key 56 which passes through the disc 48 near one end. As may be seen, the key 50 is placed at a greater distance from the end of the tube than the key 56. Also the disc 46 is larger and has greater mass. Therefore, when the device with the baited hook is submerged in water, it is balanced so that it floats substantially level or horizontally. Considering the attachment to the swivel 52 as being a pivot about which the caller would rotate; the forces of the disc 46 pulling down and the bouyancy of the air space pulling up would tend to rotate the device in one direction. This is counter-balanced by the majority of the weight of the tube itself and by the disc 46 which is at a further distance from the pivot point, as well as the weight of the hook and associated swivel.

If live bait such as a minnow is placed upon the hook, its movement will cause the balance of the caller to be upset. Therefore, the shot will roll from one end of the tube to the other. This will cause a buzzing or rattling sound which simulates the sound of certain insects. It has been found to be quite efficient in attracting fish. If live bait is not used, usually there will be sufficient movement of water for this effect.

When a fish takes the baited hook, it will pull the line from the clip 30. The tension of the spring 20 will exert a force on the line as described above. This force will gently draw the fish to the surface of the water near the device. The line will reel in as the cord unwinds from the shaft. The angler knows a fish has been caught when he sees the device moving about, due to the action of the fish. The spring is not strong enough to pull the fish from the water, but only to the surface.

Although any particular arrangement may be used for the shaft 16, we have found it advantageous from the manufacturing standpoint to use a cotter key as the shaft. Loop 58 of the cotter key fits within a notch in the reel at the center thereof. The other end of the cotter key is clipped within hollow cap 24 to provide a connection at this point.

It will be apparent that the embodiment shown is only exemplary and that various modifications can be made in construction, materials, and arrangement within the scope of the invention as defined in the appended claims.

We claim as our invention:

1. A fishing device comprising: a tube, a shaft mounted for rotation at one end of the tube at right angles to the axis of the tube, a spring attached at the other end of the tube to a member traversing the tube, said member being adapted to support the device in water while fishing, a cord extending from the spring to the shaft, the cord being attached to the spring and wound around the shaft thereby cocking the spring, a reel fixed to the shaft, a line around the reel, a hook on the end of the line and a clip attached to the tube, the line being adapted to be removably secured in the clip thereby holding the spring in cocked position so that if the line is removed from the clip it is wound on the reel as the cord unwinds from the shaft to rotate the reel.

2. The invention as defined in claim 1 wherein the said clip comprises helical spring, some of the terminal revolutions of which are bent so that their axis is normal to the axis of the undistorted portion, and the line extends through the undistorted portion and is clipped between two of the bent revolutions.

3. The invention as defined in claim 1 wherein said shaft is a cotter key with a loop at one end, the key extending diametrically through the tube, the reel having a notch at the center, the loop of the key fitting in the notch, and a cap attached to the other end of the key so that the key cannot move axially.

References Cited in the file of this patent

UNITED STATES PATENTS

| | | |
|---|---|---|
| 542,917 | Bardsley | July 16, 1895 |
| 751,734 | Hymers | Feb. 9, 1904 |
| 2,631,399 | Sowa | Mar. 17, 1953 |
| 2,659,176 | Wenger | Nov. 17, 1953 |
| 2,718,725 | Thurman | Sept. 27, 1955 |
| 2,918,745 | Haynie | Dec. 29, 1959 |

FOREIGN PATENTS

| | | |
|---|---|---|
| 805,414 | Great Britain | Dec. 3, 1958 |